(12) United States Patent
Bakshi

(10) Patent No.: US 11,068,387 B1
(45) Date of Patent: Jul. 20, 2021

(54) CLASSIFYING A TEST CASE EXECUTED ON A SOFTWARE

(71) Applicant: Webomates LLC, Stamford, CT (US)

(72) Inventor: Aseem Bakshi, Darien, CT (US)

(73) Assignee: WEBOMATES INC., Stamford, CT (US)

( * ) Notice: Subject to any disclaimer, the term of this patent is extended or adjusted under 35 U.S.C. 154(b) by 0 days.

(21) Appl. No.: 16/853,061

(22) Filed: Apr. 20, 2020

(51) Int. Cl.
  *G06F 11/36* (2006.01)
  *G06N 20/00* (2019.01)

(52) U.S. Cl.
  CPC ...... *G06F 11/3692* (2013.01); *G06F 11/3684* (2013.01); *G06F 11/3688* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 9,710,364 B2 * | 7/2017 | Herzig | G06F 11/3692 |
| 9,864,679 B2 * | 1/2018 | Brealey | G06F 11/3692 |
| 10,572,374 B2 * | 2/2020 | Sharma | G06N 20/00 |
| 10,684,851 B2 * | 6/2020 | Burli | G06N 20/00 |
| 10,776,252 B1 * | 9/2020 | Weiss | G06F 11/3684 |
| 2008/0222501 A1 * | 9/2008 | Travison | G06F 11/366 714/819 |
| 2013/0036405 A1 | 2/2013 | Verbest | |
| 2013/0151906 A1 * | 6/2013 | D'Alterio | G06F 11/3692 714/38.1 |
| 2013/0179734 A1 * | 7/2013 | Perin | G06F 11/3696 714/32 |
| 2014/0365828 A1 | 12/2014 | Jiang et al. | |
| 2015/0019912 A1 * | 1/2015 | Darling | G06F 11/2257 714/26 |
| 2018/0300229 A1 | 10/2018 | Kornfeld et al. | |

FOREIGN PATENT DOCUMENTS

WO    2007005123 A2    1/2007

* cited by examiner

*Primary Examiner* — Marina Lee
(74) *Attorney, Agent, or Firm* — Shumaker, Loop & Kendrick, LLP

(57) ABSTRACT

A system and a method for classifying a test case executed on a software. Post execution, an actual result of the test case is received. A probability of the actual result being either a true failure or a false failure is determined. Further, the actual result is classified as the true failure or the false failure based on the probability. Subsequently, a recursive execution of the test case is recommended when the actual result is classified as the false failure until the actual result is classified as the true failure or a true pass. If the recursive execution fails to lead to either true positive or true negative, a reviewer' feedback is received for classification. Finally, a deviation between the classification and the feedback is recorded to classify results of subsequent test cases as true failures or false failures using an adaptive intelligence technique.

19 Claims, 8 Drawing Sheets

US 11,068,387 B1

CLASSIFYING A TEST CASE EXECUTED ON A SOFTWARE

TECHNICAL FIELD

The present subject matter described herein, in general, relates to a system and a method for classifying a test case executed on a software.

BACKGROUND

Generally, every software is launched after performing a series of testing on each functionality of the software. In order to perform the testing, a software developer may write a test script to validate each functionality of the software. Further, the test scripts may be executed on the software by a team to identify any defects in the software. Conventionally, the team may utilize testing techniques comprising unit testing, integration testing, system testing, sanity testing, smoke testing, interface testing, regression testing, beta/acceptance testing and the like. Further to performing the testing, the team needs to critically analyze an outcome of each test script to identify one or more defects or bugs in the software. In on example, the team may comprise two or more users analyzing the test outcome independent to one another. Thus, the analysis solely relies on manual skills and acumen which may be susceptible to errors. In addition, the analysis may be also impacted because of a change in environment, a modification of test scripts, a modification in a functionality of the software and the like.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for classifying a test case executed on a software. This summary is not intended to identify essential features of the claimed subject matter nor is it intended for use in determining or limiting the scope of the claimed subject matter.

In one implementation, a method for classifying a test case executed on a software is disclosed. Initially, a test case may be executed on a software. Further, an actual result of the execution of the test case may be received. Subsequently, a probability of the actual result being either a true failure or a false failure may be determined based on one of predefined rules, machine learning models, and an aggregation of the predefined rules and the machine learning models. In one aspect, the true failure may indicate a bug in the software, and the false failure may indicate one of a failure in an execution of the test case and a modification in the test case. Further, the actual result may be classified as one of the true failure or the false failure based on the probability. Subsequently, a recursive execution of the test case may be recommended when the actual result is classified as the false failure until the actual result is classified as the true failure or a true pass. A feedback may be received from a reviewer on the classification. Finally, a deviation may be recorded between the classification and the feedback to classify results of subsequent test cases as true failures or false failures using an adaptive intelligence technique. In one aspect, the aforementioned method for classifying a test case executed on a software may be performed by a processor using programmed instructions stored in a memory.

In another implementation, a non-transitory computer readable medium embodying a program executable in a computing device for classifying a test case executed on a software is disclosed. The program may comprise a program code for executing a test case on a software. The program may comprise a program code for receiving an actual result of the execution of the test case. Subsequently, the program may comprise a program code for determining a probability of the actual result being either a true failure or a false failure based on one of predefined rules, machine learning models, and an aggregation of the predefined rules and the machine learning models. In one aspect, the true failure may indicate a bug in the software, and the false failure may indicate one of a failure in an execution of the test case and a modification in the test case. Further, the program may comprise a program code for classifying the actual result as one of the true failure or the false failure based on the probability. Furthermore, the program may comprise a program code for recommending a recursive execution of the test case when the actual result is classified as the false failure until the actual result is classified as the true failure or a true pass. Subsequently, the program may comprise a program code for receiving a feedback from a reviewer on the classification. Finally, the program may comprise a program code for recording a deviation between the classification and the feedback to classify results of subsequent test cases as true failures or false failures using an adaptive intelligence technique.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system for classifying a test case executed on a software disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "executing", "receiving," "determining," "classifying," "recommending," "recording," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

The present subject matter discloses a system and a method for testing a software. It may be noted that the testing is performed in areas including, but not limited to, a User Interface (UI), an Application Programming Interface (API), load, visual and alike. It must be noted that multiple functionalities of the software are tested using one or more different types of testing techniques. For example, the UI of the software is tested using at least one of an automation testing, a manual testing, and a crowdsource testing. The automation testing comprises analysis of at least one of predefined rules, proxy logs, test case executions, a change in environment, a version change, and screenshot comparison. Similarly, the manual testing comprises analysis of at least one of a list of predefined rules, proxy logs, and test case execution. The crowdsource testing comprises analysis of at least one of worker history, test case execution, worker conflict, screenshot comparison, worker input environment, customer environment, and release notes.

It must be noted that there exists a performance comparison framework amongst the different testing techniques. The performance comparison framework compares performance of each testing technique with each other and the technique with the highest performance is selected for testing of the software. While aspects of described system and method for classifying a test case executed on a software may be implemented in any number of different computing systems, environments, and/or configurations, the embodiments are described in the context of the following exemplary system.

Figure 1:
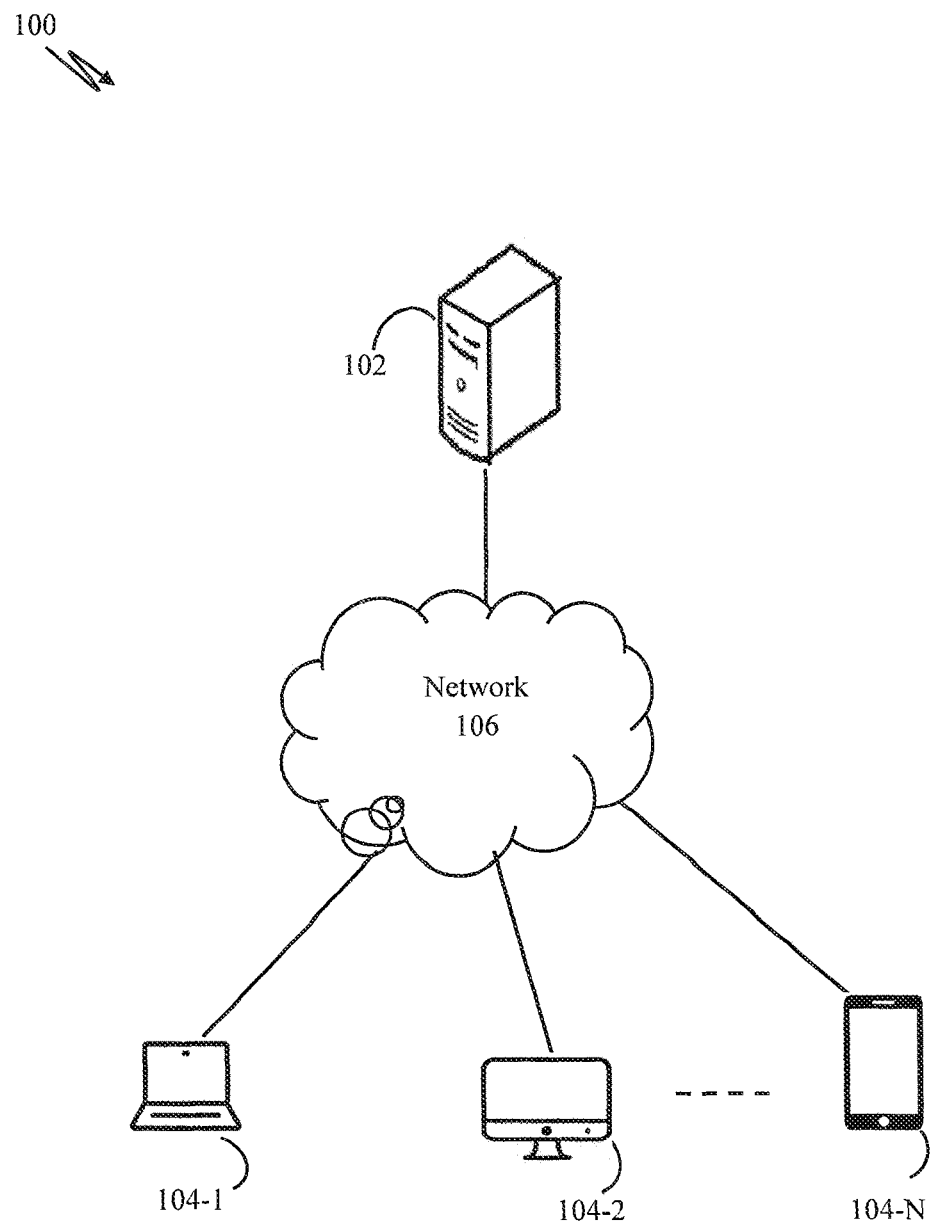
FIG. 1 illustrates a network implementation of a system for classifying a test case executed on a software, in accordance with an embodiment of the present subject matter.

Referring now to FIG. 1, a network implementation 100 of a system 102 for classifying a test case executed on a software is disclosed. Initially, the system 102 executes a test case on a software. In an example, the software may be installed on a user device 104-1. The system 102 receives an actual result of the execution of the test case from one or more user devices. It may be noted that the one or more users may access the system 102 through one or more user devices 104-2, 104-3 104-N. Further, the system may also 102 receive a feedback from a reviewer using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 104-N, collectively referred to as user devices 104, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
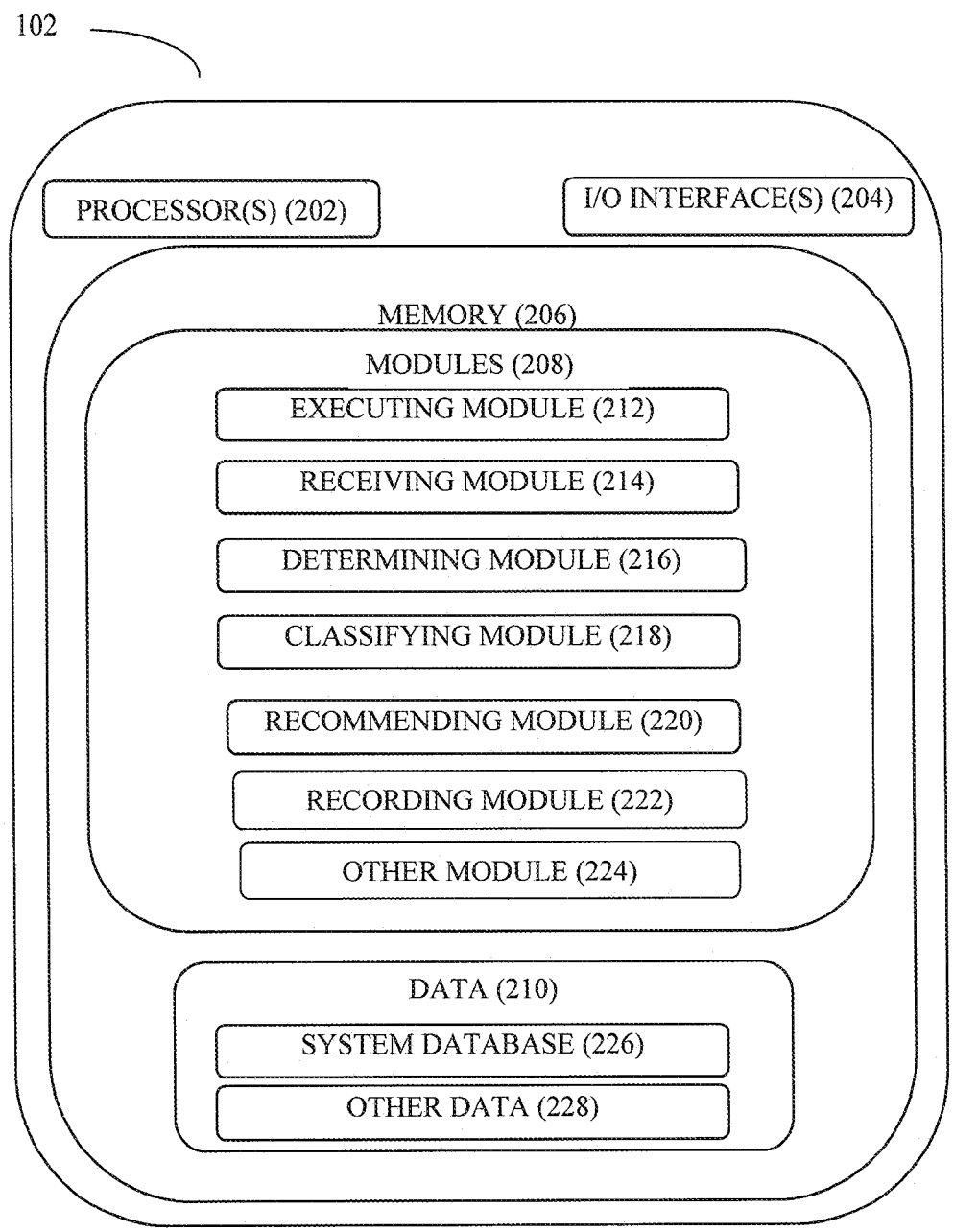
FIG. 2 illustrates the system for classifying a test case executed on a software, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or nonvolatile memory, such as read only memory (ROM), erasable programmable ROM, flash memories, hard disks, Solid State Disks (SSD), optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include an executing module 212, a receiving module 214, a determining module 216, a classifying module 218, a recommending module 220, a recording module 222, and other modules 224. The other modules 224 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 226 and other data 228. The other data 228 may include data generated as a result of the execution of one or more modules in the other modules 224.

As there are various challenges observed in the existing art, the challenges necessitate the need to build the system 102 for classifying a test case executed on a software. In order to classify the test case executed on the software, at first, a user may use the user device 104 to access the system 102 via the I/O interface 204. The user may register the user devices 104 using the I/O interface 204 in order to use the system 102. In one aspect, the user may access the I/O interface 204 of the system 102. The system 102 may employ the executing module 212, the receiving module 214, the determining module 216, the classifying module 218, the recommending module 220, and the recording module 222. The detail functioning of the modules is described below with the help of figures.

The present subject matter describes the system 102 for classifying a test case executed on a software. The system 102 may classify the test case automatically in order to identify a defect in the software. It may be noted that the classification of the test case involves almost no or minimum human intervention. The defect may also be known as a bug in the software. In order identify the defect, initially, the executing module 212 executes the test case on the software. The test case may comprise a set of conditions or variables to examine the software under test. The execution of the test case results in at least one of a true failure, a false failure, a true pass or a false pass. The true failure may indicate a bug in the software. The true failure is the defect identified by the system 102 and a reviewer. On the other hand, the false failure may be the defect identified by the system 102 and not by the reviewer. Also, the false failure may indicate a modification in the test case or a failure in the execution of the test case. The true pass is not the defect and indicates that there are no issues in the software. On the contrary, the false pass is the defect identified by the reviewer and not by the system 102.

The receiving module 214 receives an actual result of the execution of the test case. In an implementation, the actual result may be provided by the system 102. The test case comprises at least one of an automation test case, a manual test case, and a crowdsource test case. The automation test case may be executed automatically without any human intervention. It has also been observed that the execution of the automation test case may be particularly prone to the false failure. The automation test case comprises one of predefined rules, machine learning models, and an aggregation of the predefined rules and the machine learning models. If an execution fails during the automation testing, the system 102 may provide a system recommendation corresponding to the predefined rule. In one embodiment, the system recommendation may also be reviewed by the reviewer. Table 1 below highlights the predefined rules and the corresponding recommendation provided by the system 102.

TABLE 1

| Rules | System Recommendation |
|---|---|
| If the execution failed in the last overnight or full execution cycle for the same platform and Valid new or valid known defect is associated with the test case | Known Defect |
| Assertion Error Test case is "up To Date" | Possible New Defect |
| TimeoutException | Locator ID Changed |
| Test case is marked as "Need update" | Test Case Update |
| Non-selenium Java exception Selenium type Exception | Script Error |

In one implementation, the automation test case may also be executed using the machine learning models. The machine learning models may comprise at least one of a Hybrid Neural Network (HNN), a Random Forest Classifier (RFC), and any other machine learning algorithm. The HNN may be created using a Feedforward Neural Network (FNN) combined with a Long-Short Term Memory Network (LSTM) for predicting the false failures. Table 2 mentions about type of input parameters, features of the input parameters, and the meaning of the input parameters applicable for the machine learning models.

TABLE 2

| Type | Feature | Meaning |
|---|---|---|
| Dependent Variable | STATUS | "FAIL" means true failure and "PASS" means false failure |
| Platform | PLATFORM_ID | Platforms used to run the test |
| Failure Catalog | EXCEPTION | Specific events to disrupt the execution of the program |
| Failure Description | FAILURE DETAIL | Error detection during executing the script |

In one embodiment, the RFC may be used to classify the true failures and the false failures. The RFC is a supervised learning classification model. The RFC may comprise input parameters like priority, is_grid_supported, description_count, manual, mturk, automation, API, GUI, time_min, execution_focus, browser_mode, flow_name, page, feature, environment_name, failure_detials, and expected_result. It may be noted that the HNN and the RFC models are trained using an adaptive intelligence.

In another implementation, the automation test case may also be executed using the aggregation of predefined rules and machine learning models. The aggregation of predefined rules and machine learning models comprise at least a past user behavior, an execution history of the test case, a test environment, a bug video, a time taken by the user to execute the test case, a proxy log, and a version change. In an embodiment, the automation test case may also be executed using algorithms on the history of the execution of the test case. It may be noted that the algorithms may rely on the system recommendations of the past failures. In an example, when the execution of the automation test case fails, below mentioned steps are executed by the system 102.

Step 1: Check the failure logs of the same test case when the automation test case failed in the past;

Step 2: Compare the current failure log with the past logs;

Step 3: Out of top 10 search result appearing in an elastic search in historical logs—find cumulative score of user recommendations;

Step 4: Recommend the highest cumulative score.

The elastic search may analyze a log of the history of the execution of the test case and divide the log in terms (words) with a tokenizer. Further, an importance of each term may be calculated. The elastic search may compute relation of Term Frequency (TF)-Inverse Document Frequency (IDF) for each term (word) present in the analyzed log. The IDF is a statistical measure used to assess the importance of the term (word) in a context of the log. The weight of a term (word) is proportional to an amount of use of the term (word) in the analyzed log, and inversely proportional to the frequency of term (word) usage in an index. In one aspect, the elastic search may ignore the term when the importance associated to the term is below a predefined threshold. On the other hand, the term (word) with importance more than the predefined threshold is used frequently in the analyzed log and moderately in the index. Subsequently, the elastic search may calculate a level of equality between an analyzed historical log and each historical log present in the index. It may be noted that the cumulative score may be calculated for each log present in the index. The elastic search may return the top 10 analyzed logs for identifying the defect.

In yet another implementation, the automation test case may also be executed on a new software release with new features and defect fixes. The new software release may result in modified test cases for testing. The modified test cases may always fail in an automation run. The modified test may therefore require updates over previous test cases/scripts written for the previous test cases. The analysis of the new software release may facilitate in identification of the false fails. The modified test cases may be the reason of the false fails.

In yet another implementation, an analysis of the automation test case execution may identify the test cases that have failed due to changes in the customer environment. For example, a staging environment may not have same data as a production environment. Alternatively, some services may not be functional in a development environment. It may be noted that the true fails in the development environment or the staging environment may not help a user as the defects are limited to the development environment or the staging environment. The defects may not occur in the production environment. In reality, the test cases need to be re-executed without the environment to validate working of the software.

In yet another embodiment, the test case may also be the manual test case. The manual test case is executed by the user. The user may be a software architect or a testing professional. The manual test case may be executed based on predefined scripts written by the user. In an implementation, the result of the execution of the manual test case may be examined using at least one of the predefined rules, the machine learning models and an analysis of the test case execution in the past.

In yet another implementation, the test case may also be the crowdsource test case. The crowdsource test case is executed by at least two workers in the network working independently of one another. Each worker is a user performing the testing on the software. The at least two workers may test the software by using a remote access to the software. The crowdsource test case may analyze at least one of a worker profile, the history of test case execution, a worker conflict, a screenshot comparison, a worker input error, the customer environment, and the modified test case or the release notes. The worker profile may contain historical information about test cases executed by the worker. The historical information may comprise number of test case executions, number of failed executions, results of the test cases, feedback on the test cases, details on validation points and the like. It may be noted that the historical information may be used by the system 102 to predict at least one of the true failure, the false failure, the true pass and the false pass. It may also be noted that mistakes performed by the workers may also result in an incorrect classification of the test case execution results.

Further to receiving the actual result, the determining module 216 determines a probability of the actual result being either the true failure or the false failure. The probability may be determined based on one of the predefined rules, the machine learning models, and the aggregation of the predefined rules and the machine learning models. It must be noted that the probability is determined in real time without any human intervention. Furthermore, the classifying module 218 classifies the actual result as one of the true failure or the false failure based on the probability. It may be noted that the actual result may be classified as the true failure when the probability is more than a predefined threshold value. Similarly, the actual result may be classified as the false failure when the probability is less than the predefined threshold value.

In one embodiment, the classifying module 218 may create a set of a plurality of test cases with actual results as false failures. The classifying module 218 may create the set based on the system recommendation associated with each false failure. In other words, the classifying module 218 creates the set based on similarity of the system recommendation provided by the system automatically.

Upon classification, the recommending module 220 may recommend a recursive execution of the test case. In one aspect, the recursive execution may be recommended when the actual result is classified as the false failure. The recursive execution may be performed until the actual result is classified as the true failure or the true pass. In one embodiment, the recommending module 220 may recommend recursive execution of the set of the plurality of test cases until the actual result for each test case is classified as the true failure or the true pass. In other embodiment, the recursive execution may be performed for a preset maximal number of times.

Further, the receiving module 214 may receive a feedback about the classification from the reviewer. The feedback may confirm or reject the classification provided by the classifying module 218. In one aspect, the feedback may also be received for verifying the test case when the recursive execution results in the false failure. In one example, the feedback is either an approval of the classification or a rejection of the classification. In one scenario, the classifying module 218 may classify the actual result as the true failure and the reviewer may reject the classification. In another scenario, the reviewer may approve the classification provided by the classifying module 218.

Post receiving the feedback, the system 102 may record a deviation between the classification and the feedback. In one embodiment, the deviation may be recorded by the recording module 220. The recorded deviation may facilitate to classify results of subsequent test cases as true failures or false failures. The deviation may be subsequently classified using an adaptive intelligence technique. The deviation may also be recorded by recording a change in the result. For Example, if the test case is classified as the true failure, the reviewer may record the change as the false failure. Similarly, if the test case is classified as a true pass, the reviewer may record the deviation as the fail pass. In an implementation, if the reviewer rejects the classification, then the recording module 220 may learn the feedback associated to the test case. For the subsequent test cases, the recording module 220 may learn the feedback against the classification and accordingly classify the subsequent cases. Similarly, if the reviewer approves the classification, then the recording module 220 may learn to associate the feedback to the subsequent test cases.

In an example, if the first test case is classified as a true failure and the deviation is recorded as the false failure, the classifying module 218 may seek feedback from the reviewer before classifying the subsequent test case. In other words, when the deviation is recorded between the classification and the feedback, the classifying module 218 seeks feedback from the reviewer before automatically classifying the subsequent test case. Similarly, if there is no deviation in the classification and the feedback, the classifying module 218 may automatically classify the subsequent test case without seeking the feedback.

In one embodiment, the classifying module 218 may be trained using the adaptive intelligence and the feedback received from the reviewer. Similarly, the predefined rules, the machine learning models, and the aggregation of predefined rules and machine learning models are also trained using the adaptive intelligence and the feedback. In an alternative embodiment, the predefined rules, the machine learning models, and the aggregation of predefined rules and machine learning models may be trained differently for different test cases like the automation test case, the manual test case, and the crowdsource test case.

In order to elucidate further, consider an example of the system 102 in accordance with an embodiment of the present subject matter. The system 102 is implemented on a web application for testing a website for booking a hotel room. The website comprises details about an availability of one or more hotel rooms. The details may include, but not limited to, a room size, number of persons allowed in the room, a price of the room, dates of stay, images of the room, name of the room, category of the room and the like. In order to identify the defect in the web application, the web application may be tested by executing at least one of an automation test case, a manual test case, and a crowdsource test case. In one scenario, a test case for booking one hotel room is executed by the system 102. The FIG. 3, FIG. 4, FIG. 5, FIG. 6, and FIG. 7 illustrate the flow of classifying the test case executed on the web application for booking the hotel room.

Figure 3:
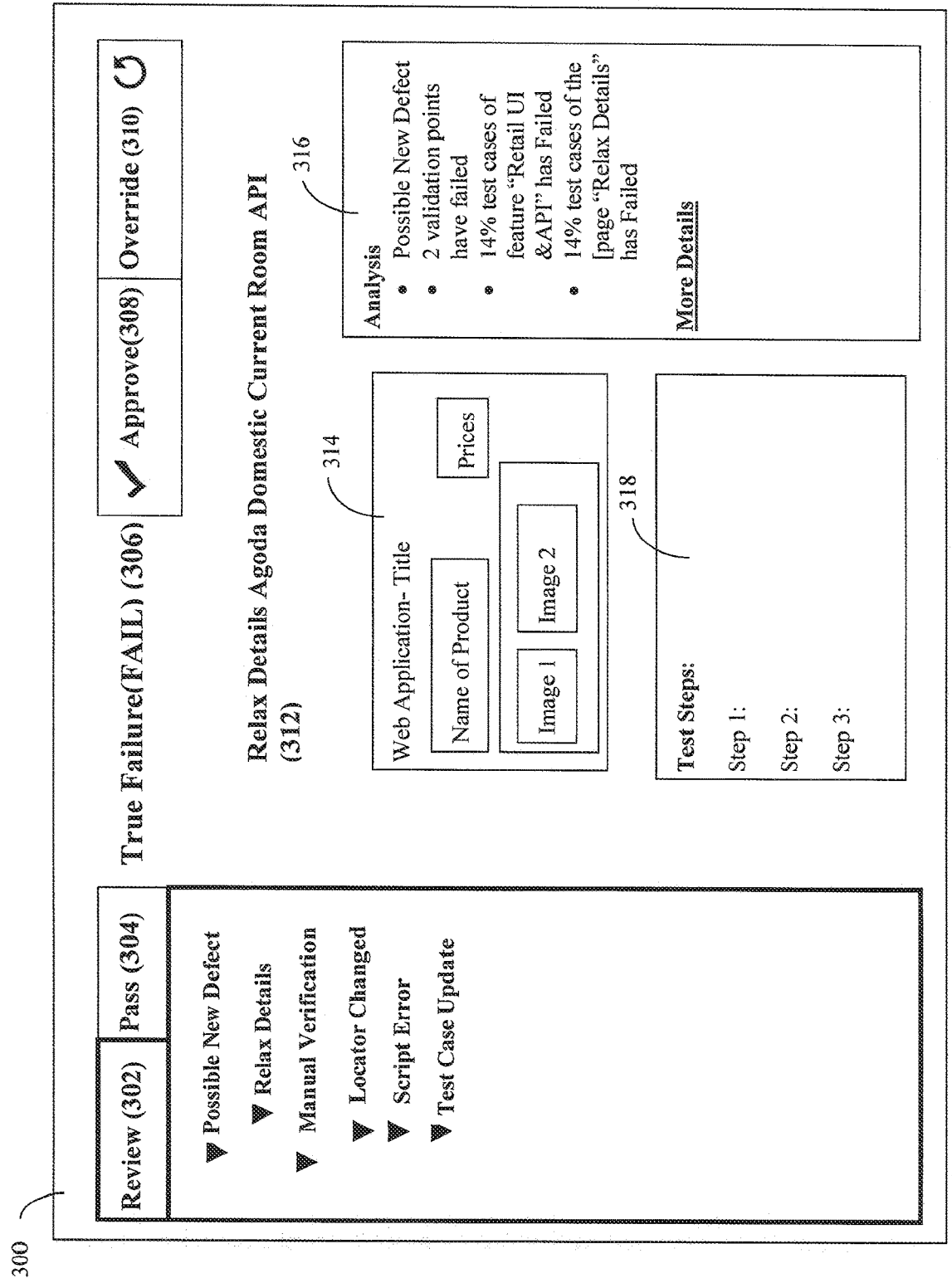
FIG. 3, FIG. 4, FIG. 5, FIG. 6, and FIG. 7 illustrate one or more examples of the system, in accordance with an embodiment of the present subject matter.

Referring now to FIG. 3, a layout 300 of the system 102 is shown in accordance with an embodiment of the present subject matter. The layout 300 illustrates a dashboard shown to the reviewer for reviewing the classification of the test case as "true failure (fail)". The test case is "Relax Details Agoda Domestic Current Room API 312" for booking the hotel room. The layout 300 comprises a review tab 302, a pass tab 304, a true failure 306, an approve button 308, an override button 310, a screenshot of the web application 314, an analysis 316, and test steps 318. The review tab 302 comprises a list of system recommendations provided like 'possible new defect', 'relax details', 'manual verification', 'locator ID changed', 'script error', and 'test case update'. The pass tab 304 may comprise one or more test cases with the "true pass" status. The reviewer may refer to the analysis 316 provided by the system 102. The analysis 316 highlights key points form the execution of the test case. The analysis 316 mentions "Possible New Defect", "2 validation points have failed", "14% test cases of feature "Retail UI & API" have Failed", and "14% test cases of the page "Relax Details" have Failed". The reviewer may have an option to click 'more details' to perform a deep analysis. The test steps 318 may mention about different steps performed by the test case to book the hotel room. The screenshot of the web application 314 may comprise a title of the web application, images, prices, name of the hotel, and the like. The reviewer may record the feedback by selecting either of the override button 310 or the approve button 308.

Further, the system 102 displays a dashboard with an analysis on one or more validation points present in the test case for booking the hotel room. The dashboard may further comprise a table with an index, a description of each validation point, a system expected result, an actual result, a reviewer answer, and a re-recommend button to update the system recommendation. The reviewer may enter answer under the reviewer answer and submit the answer by clicking the re-recommend button. It may be noted that the reviewer answer may be used by the system to train the algorithms for subsequent execution of the test case. In one aspect, the training may improve an accuracy of the system expected results.

Figure 4:
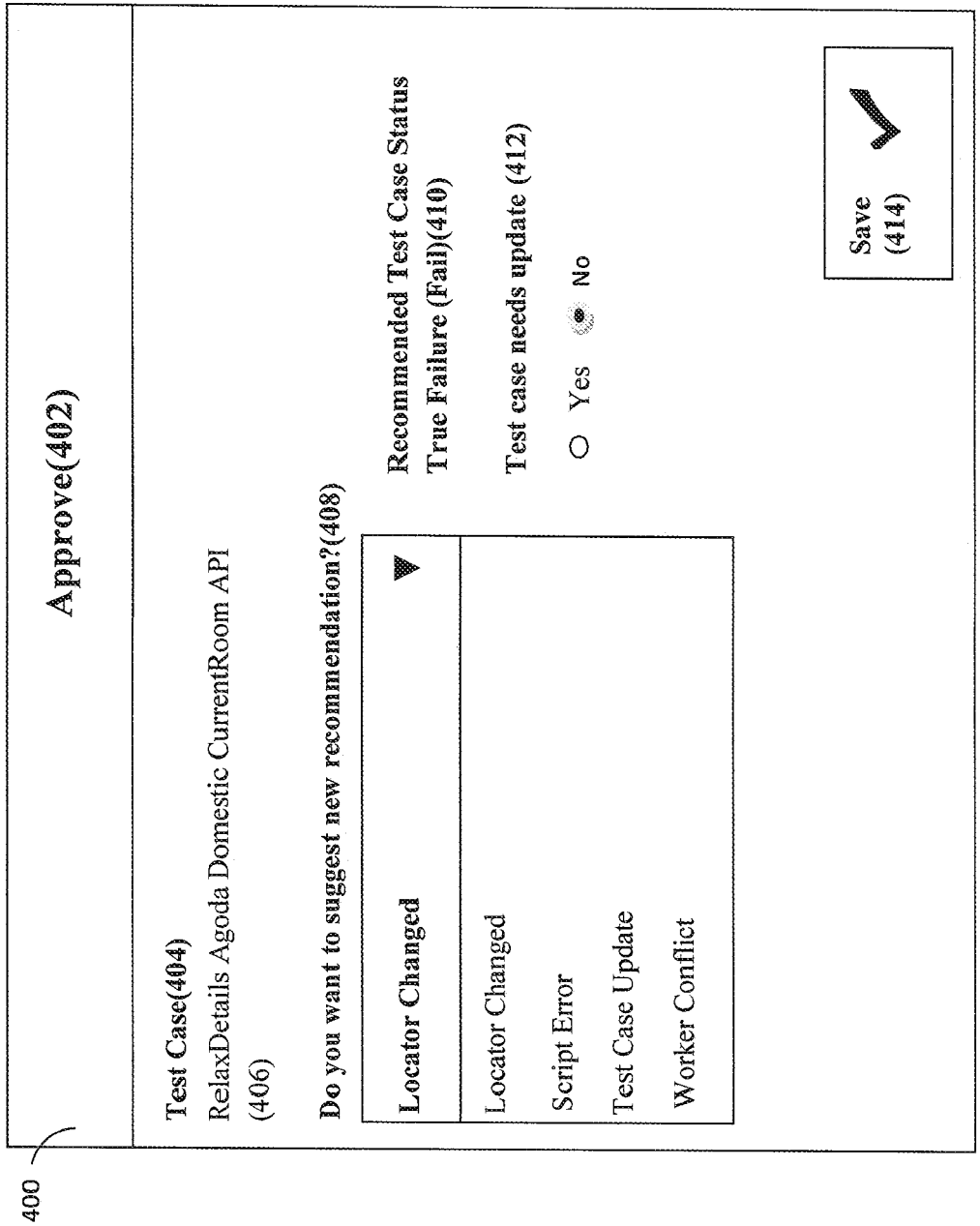

Referring now to FIG. 4 illustrating a layout 400 of approve window of the system 102 in accordance with the embodiment of the subject matter. The layout 400 displays a popup window for recoding the approval of the reviewer. The reviewer may record the feedback by selecting the system recommendation from a recommendation tab 408. The 'recommendation tab 408' comprises a locator ID change, a script error, a test case update, and a worker conflict. Further, the reviewer may asses the status of the test case. In the FIG. 6, the status is 'True failure (Fail) 410'. If the test case needs any update, the reviewer may suggest the same by selecting 'yes' or 'no' option from 'test case needs update 412'. Finally, the reviewer may record the feedback by clicking save 414.

Figure 5:
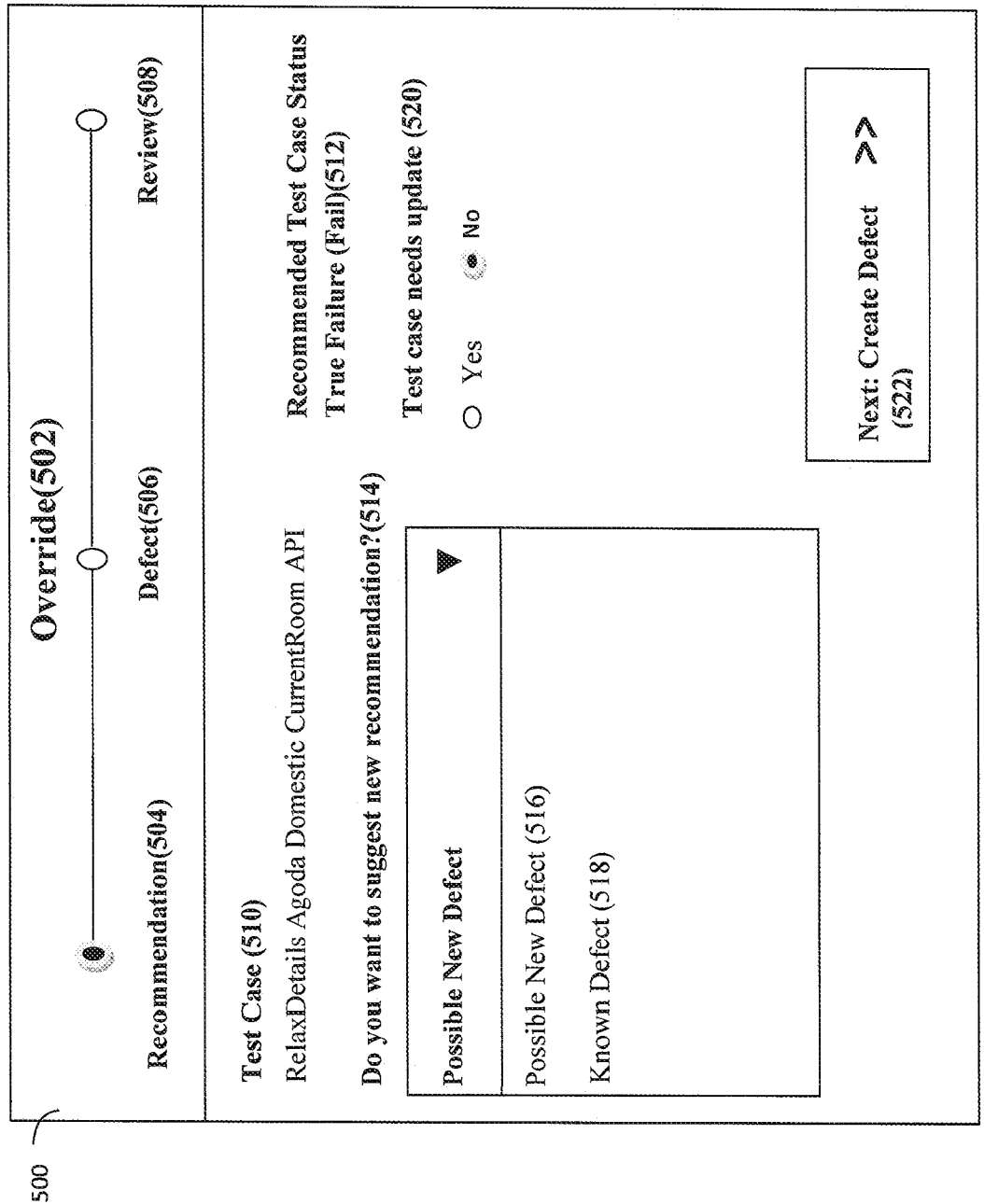
Figure 6:
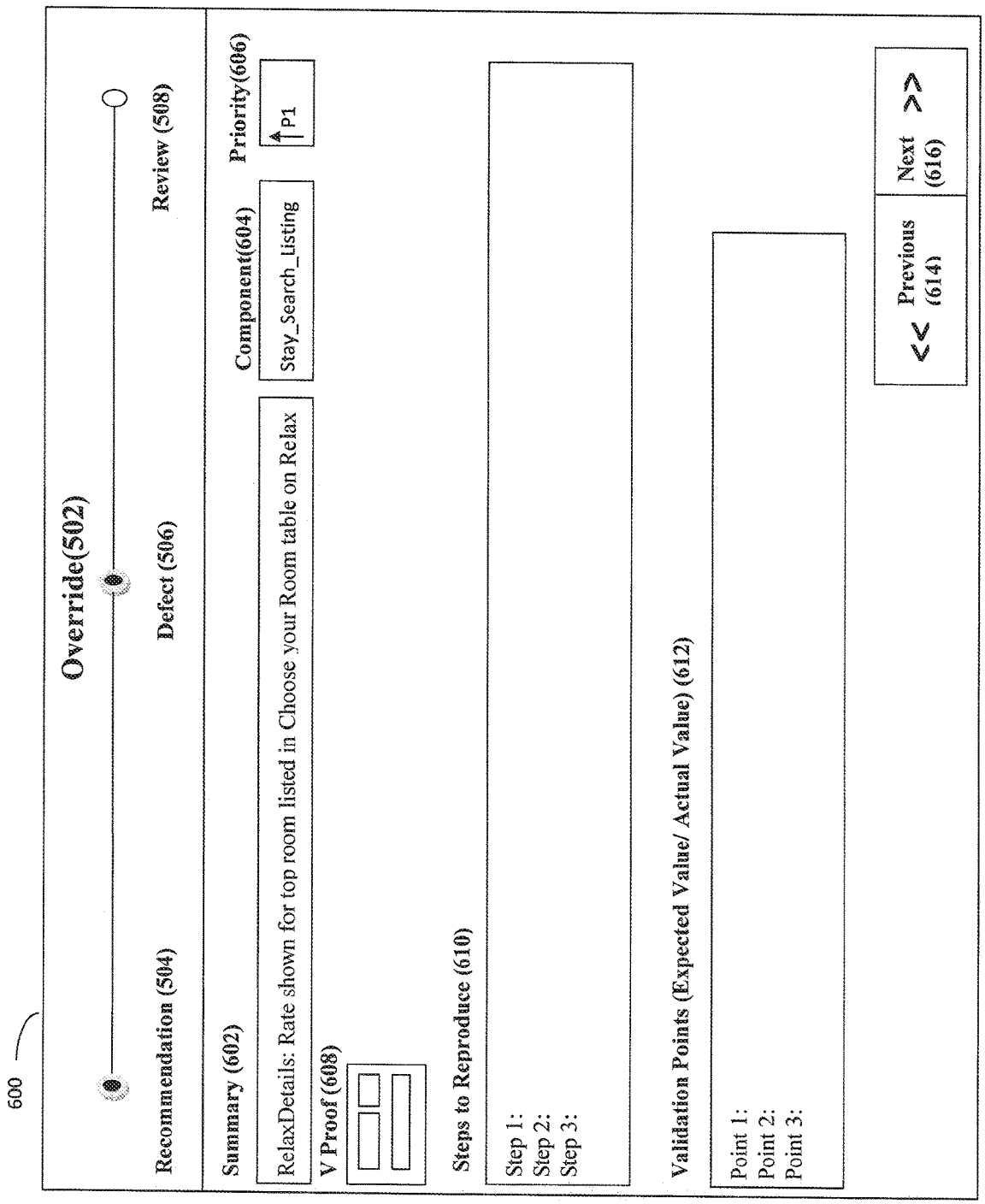
Figure 7:
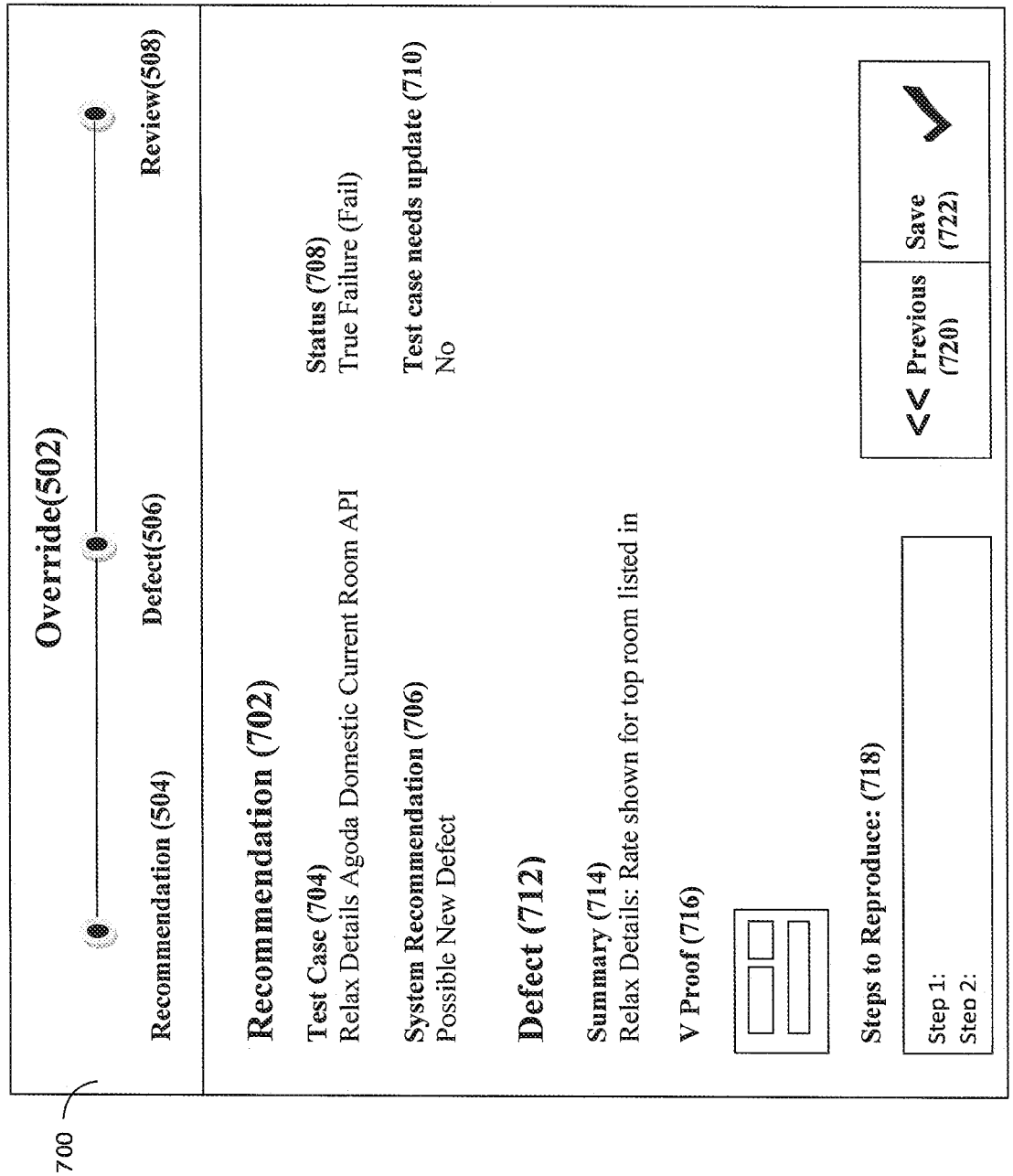

In one embodiment, the reviewer may wish to override the system recommendation provided by the system 102. The FIG. 5, FIG. 6 and FIG. 7 illustrate an example of overriding the system recommendation in accordance with the embodiment of the present subject matter. Referring now to the FIG. 5, a layout 500 displays a recommendation page to capture the feedback of the reviewer. The layout comprises a recommendation 504 page, a defect 506 page, and a review 508 page. In the recommendation 504 page, the reviewer may observe test case 510. In the instant case, the test case 510 comprise "RelaxDetails Agoda Domestic CurrentRoom API". Further, the reviewer may be prompted to suggest a new recommendation 514 using a drop down list. The drop down list may comprise a list of the system recommendations on the defect like the possible new defect 516, the known defect 518 and the like. Further, the layout 500 comprises recommended test case status 512. In addition, the reviewer may also provide feedback if the 'test case need update 520'. The reviewer may simply select radio buttons 'yes' or 'no' to record the feedback about whether the test case needs update. Finally, the reviewer may be prompted to click "Next: Create Defect" in order to create the defect by overriding the system recommendation.

Referring now to FIG. 6, the layout 600 displays the defect 506 page. The reviewer may be prompted to create the defect by providing a summary 602, a component 604, priority 606, a video proof 608, steps to reproduce 610, validation points 612. The reviewer further may choose to select either a previous 614 or a next 616.

Referring now to FIG. 7, the layout 700 displays the review 508 page. The review page comprises sections like the recommendation 702 and the defect 712. The recommendation section comprises the test case 704, status 708, the system recommendation 706, and test case needs update 710. The defect sections comprises summary 714, the video proof 716, the steps to reproduce 718, the previous 720 and a save option 722. It may be noted that by clicking the save option 722, the reviewer may override the system recommendation and the system accordingly may get trained in real time.

Figure 8:
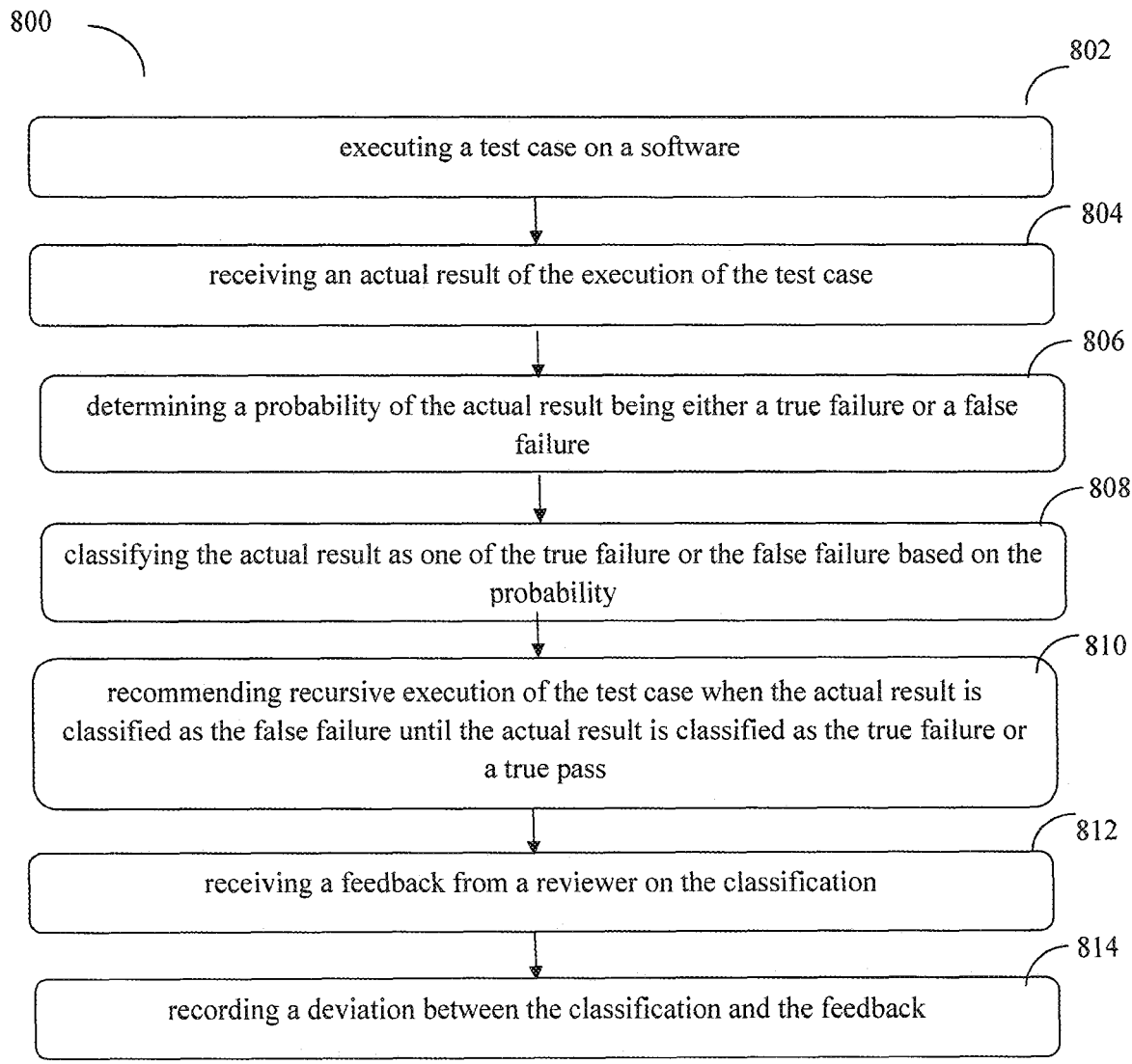
FIG. 8 illustrates a method for classifying a test case executed on a software, in accordance with an embodiment of the present subject matter.

Referring now to FIG. 8, a method 800 for classifying a test case executed on a software is shown, in accordance with an embodiment of the present subject matter. The method 800 may be described in the general context of computer executable instructions. Generally, computer executable instructions can include routines, programs, objects, components, data structures, procedures, modules, functions, etc., that perform particular functions or implement particular abstract data types.

The order in which the method 800 is described is not intended to be construed as a limitation, and any number of the described method blocks can be combined in any order to implement the method 800 or alternate methods for classifying a test case executed on a software. Additionally, individual blocks may be deleted from the method 800 without departing from the spirit and scope of the subject matter described herein. Furthermore, the method 800 for classifying the test case executed on the software can be implemented in any suitable hardware, software, firmware, or combination thereof. However, for ease of explanation, in the embodiments described below, the method 800 may be considered to be implemented in the above described system 102.

At block 802, a test case may be executed on a software. In an implementation, the executing module 212 may execute a test case on a software.

At block 804, an actual result of the execution of the test case may be received. In an implementation, the receiving module 214 may receive the actual result of the execution of the test case. Further, the actual result may be stored in the system database 226.

At block 806, a probability of the actual result being either a true failure or a false failure may be determined. In one aspect, the probability may be determined based on one of predefined rules, machine learning models, and an aggregation of the predefined rules and the machine learning models. The true failure may indicate a bug in the software, and the false failure may indicate one of a failure in an execution of the test case and modification in the test case. In one implementation, the determining module 216 may determine the probability of the actual result being either the true failure or the false failure. Further, the probability may be stored in the system database 226.

At block 808, the actual result may be classified as one of the true failure or the false failure based on the probability. In one implementation, the classifying module 218 may classify the actual result as one of the true failure or the false failure.

At block 810, recursive execution of the test case may be recommended until the actual result is classified as the true failure or a true pass. In one aspect the recursive execution may be recommended when the actual result is classified as the false failure. In one implementation, the recommending module 220 may recommend the recursive execution.

At block 812, a feedback may be received from a reviewer on the classification. In one implementation, the receiving module 214 may receive the feedback from the reviewer. Further, the feedback may be stored in the system database 226.

At block 814, a deviation may be recorded between the classification and the feedback. The deviation may classify results of subsequent test cases as true failures or false failures using an adaptive intelligence technique. In one implementation, the recording module 222 may record the deviation. Further, the deviation may be recorded or stored in the system database 226.

Exemplary embodiments discussed above may provide certain advantages. Though not required to practice aspects of the disclosure, these advantages may include those provided by the following features.

Some embodiments of the system and the method enable classification of the defect in the software without any human intervention.

Some embodiments of the system and the method reduces time of the reviewer in testing the software.

Some embodiments of the system and the method enable the reviewer to override the system recommendations provided by the system.

Some embodiments of the system and the method enable real time classification of the defect in the software testing using adaptive intelligence.

Although implementations for methods and system for classifying a test case executed on a software have been described in language specific to structural features and/or methods, it is to be understood that the appended claims are not necessarily limited to the specific features or methods described. Rather, the specific features and methods are disclosed as examples of implementations for classifying the test case executed on the software.

The invention claimed is:

1. A method for classifying a test case executed on a software, the method comprising:
   executing a test case on a software;
   receiving an actual result of the execution of the test case;
   determining a probability of the actual result being either a true failure or a false failure based on one of predefined rules, machine learning models, and an aggregation of the predefined rules and the machine learning models, wherein the true failure indicates a bug in the software, and wherein the false failure indicates one of a failure in an execution of the test case and a modification in the test case;
   classifying the actual result as one of the true failure or the false failure based on the probability;
   recommending a recursive execution of the test case when the actual result is classified as the false failure until the actual result is classified as the true failure or a true pass;
   receiving a feedback from a reviewer on the classification; and
   recording a deviation between the classification and the feedback to classify results of subsequent test cases as true failures or false failures using an adaptive intelligence technique.

2. The method as claimed in claim 1, further comprises creating a set of a plurality of test cases with actual results as false failures, wherein the set is created based on a system recommendation associated with each false failure; and
   recursively executing the set of the plurality of test cases until the actual result for each test case is classified as the true failure or a true pass.

3. The method as claimed in claim 2, wherein the system recommendation comprises at least a known defect, a locator ID change, a possible new defect, a test case update, a feature change, a script error, a timeout error and a previous error found.

4. The method as claimed in claim 1, wherein the predefined rules comprise at least one of an assertion error, selenium exceptions, a timeout exception, a change in the test case, a closed defect in last cycle, and a history of failed test cases.

5. The method as claimed in claim 1, wherein the machine learning models comprise at least one of a Hybrid Neural Network (HNN) and a Random Forest Classifier (RFC).

6. The method as claimed in claim 1, wherein the aggregation of the predefined rules and the machine learning models comprise at least a past user behavior, an execution history of the test case, a test environment, a bug video, a time taken by the user to execute the test case, a proxy log, and a version change.

7. The method as claimed in claim 1, further comprising training the predefined rules, the machine learning models, and the aggregation of predefined rules and machine learning models using the adaptive intelligence technique and the feedback from the reviewer.

8. The method as claimed in claim 1, wherein the test case comprises an automation test case, a manual test case, and a crowdsource test case.

9. The method as claimed in claim 1, wherein the feedback is either an approval of the classification or a rejection of the classification.

10. A system for classifying a test case executed on a software, the system comprising:
   a memory; and
   a processor coupled to the memory, wherein the processor is configured to execute program instructions stored in the memory for:
   executing a test case on a software;
   receiving an actual result of the execution of the test case;
   determining a probability of the actual result being either a true failure or a false failure based on one of predefined rules, machine learning models, and an aggregation of the predefined rules and the machine learning models, wherein the true failure indicates a bug in the software, and wherein the false failure indicates one of a failure in an execution of the test case and a modification in the test case;
   classifying the actual result as one of the true failure or the false failure based on the probability;
   recommending a recursive execution of the test case when the actual result is classified as the false failure until the actual result is classified as the true failure or a true pass;
   receiving a feedback from a reviewer on the classification; and
   recording a deviation between the classification and the feedback to classify results of subsequent test cases as true failures or false failures using an adaptive intelligence technique.

11. The system as claimed in claim 10, further comprises creating a set of a plurality of test cases with actual results as false failures, wherein the set is created based on a system recommendation associated with each false failure; and
recursively executing the set of the plurality of test cases until the actual result for each test case is classified as the true failure or the true pass.

12. The system as claimed in claim 11, wherein the system recommendation comprises at least a known defect, a locator ID change, a possible new defect, a test case update, a feature change, a script error, a timeout error and a previous error found.

13. The system of claim 10, wherein the predefined rules comprise at least one of an assertion error, selenium exceptions, a timeout exception, a change in the test case, a closed defect in last cycle, and a history of failed test cases.

14. The system of claim 10, wherein the machine learning models comprise at least one of a Hybrid Neural Network (HNN) and a Random Forest Classifier (RFC).

15. The system of claim 10, wherein the aggregation of the predefined rules and the machine learning models comprise at least a past user behavior, an execution history of the test case, a test environment, a bug video, a time taken by the user to execute the test case, a proxy log, and a version change.

16. The system of claim 10, further comprises training the predefined rules, the machine learning models, and the aggregation of predefined rules and machine learning models using the adaptive intelligence technique and the feedback from the reviewer.

17. The system of claim 10, wherein the test case comprises an automation test case, a manual test case, and a crowdsource test case.

18. The system of claim 10, wherein the feedback is either an approval of the classification or a rejection of the classification.

19. A non-transitory computer readable medium having embodied thereon a computer program executable in the computer device for classifying a test case executed on a software, the computer program comprising program codes for:
   executing a test case on a software;
   receiving an actual result of the execution of the test case;
   determining a probability of the actual result being either a true failure or a false failure based on one of predefined rules, machine learning models, and an aggregation of the predefined rules and the machine learning models, wherein the true failure indicates a bug in the software, and wherein the false failure indicates one of a failure in an execution of the test case and a modification in the test case;
   classifying the actual result as one of the true failure or the false failure based on the probability;
   recommending a recursive execution of the test case when the actual result is classified as the false failure until the actual result is classified as the true failure or a true pass;
   receiving a feedback from a reviewer on the classification; and
   recording a deviation between the classification and the feedback to classify results of subsequent test cases as true failures or false failures using an adaptive intelligence technique.

* * * * *